United States Patent Office 3,460,917
Patented Aug. 12, 1969

3,460,917
RECOVERY OF AMERICIUM FROM PLUTONIUM METAL USING MOLTEN SALTS
Jack L. Long, Arvada, Colo., assignor, by mesne assignments, to the United States of America as represented by the United States Atomic Energy Commission
No Drawing. Filed Mar. 6, 1968, Ser. No. 710,728
Int. Cl. C01g 1/06; C22b 61/04
U.S. Cl. 23—325                                           7 Claims

ABSTRACT OF THE DISCLOSURE

A process for extracting americium from plutonium by agitating a molten mixture of plutonium containing americium with an equimolar mixture of sodium chloride and potassium chloride containing magnesium chloride wherein the salt/plutonium weight ratio is at least about 0.4.

Background of the invention

Americium-241 is important since it is used as a starting material for preparing heavier elements. Additionally, it also finds use as a radiation source material.

Aged plutonium containing plutonium-241 has been found to be a practical source of americium-241 since this latter material is a principal decay daughter of plutonium-241. Heretofore, the americium present in aged plutonium has been separated using aqueous acidic dissolution techniques, followed by precipitation and recovery of the americium as an $AmO_2$ product. This technique is time consuming, requires multistep processing and is quite expensive.

Now, unexpectedly I have found a novel process for separating americium from aged plutonium metals whereby the separation is achieved in a minimum number of steps in a non-aqueous system.

It is a principal object of the present invention to provide a novel, economical process for separating and recovering americium from aged plutonium.

It is another object of the present invention to provide a single step process for removing americium from plutonium wherein the bulk of the plutonium metal remains unchanged and which provides a salt product from which high purity americium compounds easily can be recovered.

These and other objects and advantages will readily become apparent from the detailed description presented hereinafter.

Summary

In general the present process comprises contacting, usually with agitation, a molten plutonium metal source; i.e. plutonium or a plutonium alloy, hereinafter referred to by the term "plutonium," containing on a weight basis at least about 20 parts americium, or other impurities which are at least as thermodynamically active as americium, per million parts plutonium, with a substantially equimolar mixture of sodium chloride and potassium chloride containing a significant amount, i.e. from about 0.25 to about 8 weight percent or more, of magnesium chloride. The resulting mixture is maintained at a temperature at least above the melting point of plutonium and at which the salt mixture is in the molten state, usual at from about 675 to about 800° C., preferably at from about 700 to about 750° C. for a period until at least about 60 weight percent of the americium as well as the major portion of other active impurities are removed from the plutonium melt and extracted into the salt phase. Ordinarily the reaction mixture is maintained at the indicated temperature for a period of from about 0.25 to about 6 hours, usually from about 0.5 to about 2 hours, whereupon 70 weight percent or more of the americium is separated from the plutonium melt.

The molten salt mixture containing the so-extracted americium and only minimal quantities of plutonium is separated from the americium depleted plutonium melt.

The americium, which is present as the chloride, if desired, readily can be separated from the sodium chloride-potassium chloride-magnesium chloride extractant by conventional processing techniques known to one skilled in the art, for example, by converting it to the dioxide ($AmO_2$). The americium dioxide in turn can be converted to a halide, e.g. the fluoride or chloride and in turn this halide subjected to electrolysis or reduction to obtain americium metal. Alternatively the americium dioxide can be converted directly to other compounds for use as a reactant in subsequent processes.

It is the major intent of the present process to provide plutonium which is substantially free of elements such as americium, which are thermodynamically more active than plutonium and to recover useful quantities of americium. However, if recovery of these elements is not of interest, it is to be understood that the so-purified plutonium can be used directly or subjected to further processing.

Description of preferred embodiment

In carrying out a preferred embodiment of the present invention, a molten plutonium metal source material containing by weight at least about 20 parts per million americium, usually from about 100 to about 1500 or more p.p.m., is contacted with continuous agitation under substantially anhydrous conditions with a molten salt composition consisting of an equimolar mixture of sodium chloride and potassium chloride which also contains on the total weight of the sodium chloride-potassium chloride mixture from about 2 to about 6 percent magnesium chloride. The weight ratio of salt mixture/plutonium in the reaction mass is at least about 0.4, usually from about 0.4 to about 3, and preferably ranges from about 0.9 to about 1.1 or more. The resulting reaction mass is maintained under agitation at a temperature of from about 700° to about 750° C. for a period of from about 2 to about 6 hours. Generally, it has been found that the bulk of the americium is extracted within the first hour of processing. Following this period, the salt containing at least about 70 percent of the americium and upwards to 90 percent or more of this component is separated from the americium depleted plutonium.

The americium, as indicated hereinbefore, readily can be recovered from the salt extractant.

By use of the sodium chloride-potassium chloride-magnesium chloride extractant at the salt mixture/plutonium weight ratios set forth hereinbefore rapid extraction of americium in high yield is achieved with only minimal co-extraction of the plutonium.

At lower salt mixture/plutonium weight ratios even though substantially no plutonium is extracted, the amount of americium recovered from the americium containing plutonium charge is markedly reduced.

When an equimolar sodium chloride-potassium chloride salt mixture without having a predetermined amount of magnesium chloride is employed as extractant, the americium recovery even at increased contact times, i.e. 10 hours or more, is markedly reduced.

Reactors, transport lines and vessels, material handling equipment and the like to be employed are selected and/or fabricated from those structural materials which have the requisite strength and corrosion resistant characteristics to perform satisfactorily at the operating temperatures and process conditions.

Also, to assure a minimum of degradation and decomposition of the reactants and products, the reaction usually is carried out under a substantially anhydrous inert atmosphere; e.g. argon.

The following example will serve to further illustrate the present invention but is not meant to limit it thereto.

Example.—A salt mixture consisting of an equimolar mixture of sodium chloride and potassium chloride and having about 6.08 weight percent magnesium chloride added thereto was pre-melted at about 800° C. and sparged with dry hydrogen chloride gas. Samples of the so-treated mixture were cast and solidified. Analysis of the resulting salt castings showed these contained less than 50 parts per million total detectable spectrographic impurities and less than 0.004 milligram of hydrogen chloride per gram of salt. Less than 0.2 weight percent of the magnesium was present as magnesium oxide.

About 1343 grams of plutonium metal containing about 130 parts per million americium and about 1205 grams of the salt mixture (salt/plutonium weight ratio of about 0.9) were placed in a magnesium oxide crucible. The crucible, in turn, was placed within a tantalum safety can. This whole assembly was placed within a vacuum furnace. The assembly was evacuated to an absolute pressure of about 5 microns mercury until the temperature reached about 300–400° C. at which time the chamber was filled to a slight positive pressure with argon. The heating was continued until a temperature of about 720° C. was reached and the contents of the crucible became molten. The mix was then agitated while maintaining the temperature at about 720° C. Samples of the salt extractant were taken at periodic intervals and analyzed for americium content. From these analyses, the total amount of americium present in the salt phase was calculated. The results of this study are summarized in table below.

TABLE

| Stirring time (hours) | Am in salt (p.p.m.) | Am extracted, percent of total originally present in feed metal |
|---|---|---|
| 0 | 0 | 0 |
| 1 | 103 | 71 |
| 3 | 101 | 70 |
| 5 | 108 | 75 |
| 6 | 118 | 81 |

After six hours stirring, the plutonium metal phase was analyzed and found to contain a residual americium content of about 26 parts per million americium.

During the course of the study, after one hour stirring, the salt also was analyzed for plutonium and found to contain only $9.74 \times 10^{-3}$ gram of plutonium per gram of salt. This indicated that only about 0.8 weight percent of the plutonium had been coextracted. After 6 hours' reaction the salt analyzed $1.68 \times 10^{-2}$ gram plutonium per gram of salt. This analysis showed that even after this lengthy reaction time only about 1 percent of the plutonium had been extracted.

In a control run following the procedure set forth hereinbefore, about 1357 grams of plutonium metal containing about 699 parts per million americium and and 426 grams of an equimolar sodium chloride-potassium chloride salt mixture containing about 6.1 weight percent magnesium chloride (a salt/plutonium weight ratio of about 0.3) was heated with agitation at about 700° C. for 2 hours. After this period of time only about 52 percent of the americium had been extracted.

In a second control run, about 2843 grams of plutonium metal containing 1387 parts per million americium was agitated with 1299 grams of an equimolar mixture of sodium chloride and potassium chloride (salt/plutonium weight ratio of about 0.46) at about 745° C. for about 10 hours. After this period, analysis indicated that about 40 percent of the americium had been extracted into the salt phase.

After this time, about 1099 grams of the salt for this run was agitated with about 1202 grams of the plutonium (i.e. salt/plutonium weight ratio was increased to about 0.91) at a temperature of about 700° C. for an additional 12.5 hours. Analysis of the salt extractant at the end of the study after a total reaction time of 22.5 hours, indicated about 68 percent americium had been extracted.

Various modifications can be made in the present invention without departing from the spirit or scope thereof for it is understood that I limit myself only as defined in the appended claims.

I claim:
1. A process for separating americium from plutonium metal source material having americium metal present therewith which comprises:
   (a) providing plutonium containing on a weight basis at least about 20 parts americium per million parts of said plutonium,
   (b) contacting with agitation said plutonium with a molten salt mixture consisting of an equimolar mixture of sodium chloride and potassium chloride containing a significant amount of magnesium chloride, the weight ratio of said salt mixture to said plutonium being at least about 0.4,
   (c) maintaining the resulting reaction mass under agitation at a temperature at least above the melting point of said plutonium and at which the salt mixture is in the molten state for a period of time such that at least about 60 percent of the americium is removed from said plutonium metal source material and extracted into said molten salt in the form of americium chloride, and
   (d) separating said molten salt from the americium depleted plutonium metal source material.
2. The process as defined in claim 1 and including the step of recovering said americium from said salt mixture.
3. The process as defined in claim 1 wherein the salt mixture contains on a weight basis from about 2 to about 6 percent magnesium chloride.
4. The process as defined in claim 1 wherein the weight ratio of said salt mixture to said plutonium ranges from about 0.4 to about 3.
5. The process as defined in claim 1 wherein the plutonium originally contains at least about 100 parts per million americium.
6. The process as degned in claim 3 wherein the agitated reaction mass is maintained at from about 700 to about 800° C. for a period of from about 0.25 to about 6 hours and sufficient to extract into the salt phase at least about 70 weight percent of the americium originally present in said plutonium metal source material.
7. The process as defined in claim 6 wherein the agitated reaction mass is maintained at from about 700° to about 750° C. for a period of from about 0.5 to about 2 hours and the weight ratio of said salt mixture to said plutonium is from about 0.9 to about 1.1.

References Cited

UNITED STATES PATENTS 3,152,887   10/1964   Lawroski et al. _____ 23—325
3,147,109    9/1964   Knighton et al. _____ 75—84.1

CARL D. QUARFORTH, Primary Examiner

MICHAEL J. McGREAL, Assistant Examiner

U.S. Cl. X.R.

23—343, 344; 75—84